United States Patent [19] [11] 3,896,488
Carney et al. [45] July 22, 1975

[54] LOAD SURVEY RECORDER INCLUDING TAPE CARTRIDGE RECEPTACLE

[75] Inventors: Murray C. Carney; David G. Hart, both of Springfield, Ill.

[73] Assignee: Sangamo Electric Company, Springfield, Ill.

[22] Filed: Apr. 19, 1973

[21] Appl. No.: 352,550

[52] U.S. Cl. .......................... 360/6; 360/5; 360/105
[51] Int. Cl. ........................... G11b 5/00; G11b 5/54
[58] Field of Search ............... 179/100.2 Z, 100.2 T; 242/199, 200, 68.3; 346/74 M; 360/105, 5, 6

[56] References Cited

UNITED STATES PATENTS

| | | | |
|---|---|---|---|
| 2,712,448 | 7/1955 | Schroter | 360/93 |
| 3,212,076 | 10/1965 | Guerth | 360/6 |
| 3,331,563 | 7/1967 | Roecks | 242/68.3 |
| 3,346,840 | 10/1967 | Lara | 360/6 |
| 3,495,835 | 2/1970 | Laa | 179/100.2 Z |
| 3,524,651 | 8/1970 | Ketzer | 179/100.2 Z |
| 3,601,557 | 8/1971 | Lenox | 179/100.2 Z |
| 3,766,327 | 10/1973 | Johnson et al. | 179/100.2 Z |

*Primary Examiner*—Bernard Konick
*Assistant Examiner*—Jay P. Lucas
*Attorney, Agent, or Firm*—Johnson, Dienner, Emrich & Wagner

[57] ABSTRACT

The survey recorder is disclosed as being assembled in a rectangular shaped casing having a hinged cover. Stop means are provided on the hinge cover to prevent its closure in the event that the recording mechanism is not correctly engaged. An arm member which carries the recording head is pivotally mounted in the tape cartridge receptacle such that it can be swung down into operating engagement with the magnetic tape portion extending between the supply reel and the takeup reel of the tape cartridge. The tape recorder receptacle also has a plurality of alignment pins which correctly locate the tape cartridge relative to the recording head with respect to the horizontal, vertical and azimuth planes. A pressure roller is floatingly mounted on the outer end of the pivoted arm member so that when the arm member is brought down into its operating position the pressure roller will bear uniformly against the capstan to provide tape movement with improved alignment relative to the head in its movement therepast.

26 Claims, 8 Drawing Figures

LOAD SURVEY RECORDER INCLUDING TAPE CARTRIDGE RECEPTACLE

BACKGROUND OF THE INVENTION

This invention relates to recorders which provide a magnetically recorded tape record of any media which may be measured in terms of an electrical pulse output, a change in electrical state or the like.

In one specific field application such type recorder is used to measure electrical power consumption as an aid to the utility in determining load parameters and other distribution requirements. Load survey recorders of this type use a magnetic tape which is generally enclosed in a cartridge or cassette for protection of the recorded data from mechanical damage during operation or cartridge changeout. One type of recorder in the field uses a narrow magnetic tape of the order of ¼ inch on which there is recorded one or more data tracks and a time track. It is essential in recorders used to record data and time on magnetic tape that the tape be in intimate contact with the recording head as the tape is advanced by the capstan. To insure that this relationship between the tape and recorder head is maintained it is desirable to precisely install the tape cartridge in the tape cartridge receptacle such that the tape cartridge consistently lines up with horizontal, vertical and azimuth reference planes of the tape recorder receptacle. It is also critical that the capstan consistently pull the tape straight across the recorder head so that all the data will be placed in the correct location on the tape in each of the recording tracks or channels.

An object of this invention is to provide a load survey recorder having a tape cartridge receptacle that permits quick insertion of the tape cartridge and automatically aligns the tape cartridge relative to the recorder head with respect to the horizontal, vertical and azimuth reference planes.

A further object of this invention is to provide a load survey recorder having a pivotally mounted arm member that carries both the recording head and a pressure roller in which the pressure roller is floatingly mounted by a double spring arrangement so that it bears against the capstan uniformly to insure that the tape is pulled straight across the recording head.

SUMMARY OF THE INVENTION

A load survey recorder embodying the principles of this invention comprises a tape cartridge receptacle which includes a plurality of alignment pins for correctly locating the tape cartridge relative to a pivotally mounted arm member that carries the recording head and a spring biased pressure roller. The pivotal arm member when swung down into the operating position with the tape cartridge causes the recording head to be brought into tension engagement across the entire width of the magnetic tape by virtue of the alignment pins correctly locating the tape cartridge with respect to the recording head for the horizontal, vertical and azimuth reference planes. The pressure roller is floatingly mounted such that it passes the magnetic tape against the capstan in a manner to cause the magnetic tape to be pulled uniformly across the recording head.

DESCRIPTION OF DRAWINGS

For a better understanding of this invention, reference may be made to the accompanying drawings, in which.

DESCRIPTION OF PREFERRED EMBODIMENT

Figure 1:
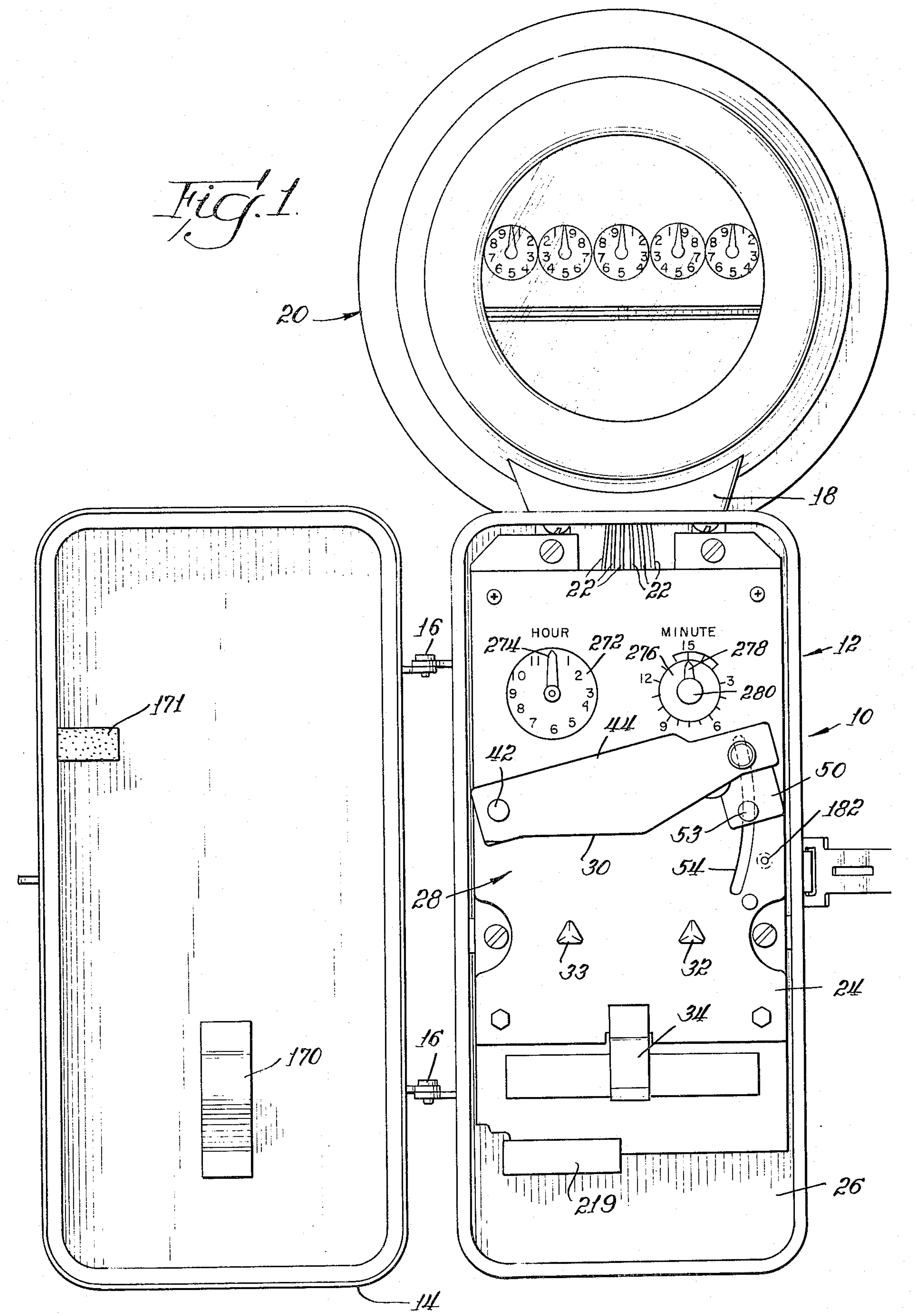
FIG. 1 is a front elevational view of the preferred embodiment of this invention shown attached to a watthour meter.

There is shown in FIG. 1 a recorder such as used in load survey applications which embodies the principles of this invention and is generally designated by the reference numeral 10. The load survey recorder 10 has a generally rectangular shaped case 12 with a front cover 14 that is pivotally fastened to one side of case 12 by means of hinges 16. The casing 12 is coupled to an extending flange 18 of meter 20 which in one application comprises a conventional kilowatt hour meter manufactured by Sangamo Electric Company as a Type J4 meter equipped with a pulse initiator. A relatively large passageway (not shown) is provided through one wall of the casing 12 and through the housing of the kilowatt hour meter 20 to provide a conduit for carrying the electrical leads 22 that interconnect the watthour meter and the load survey recorder.

Figure 2:
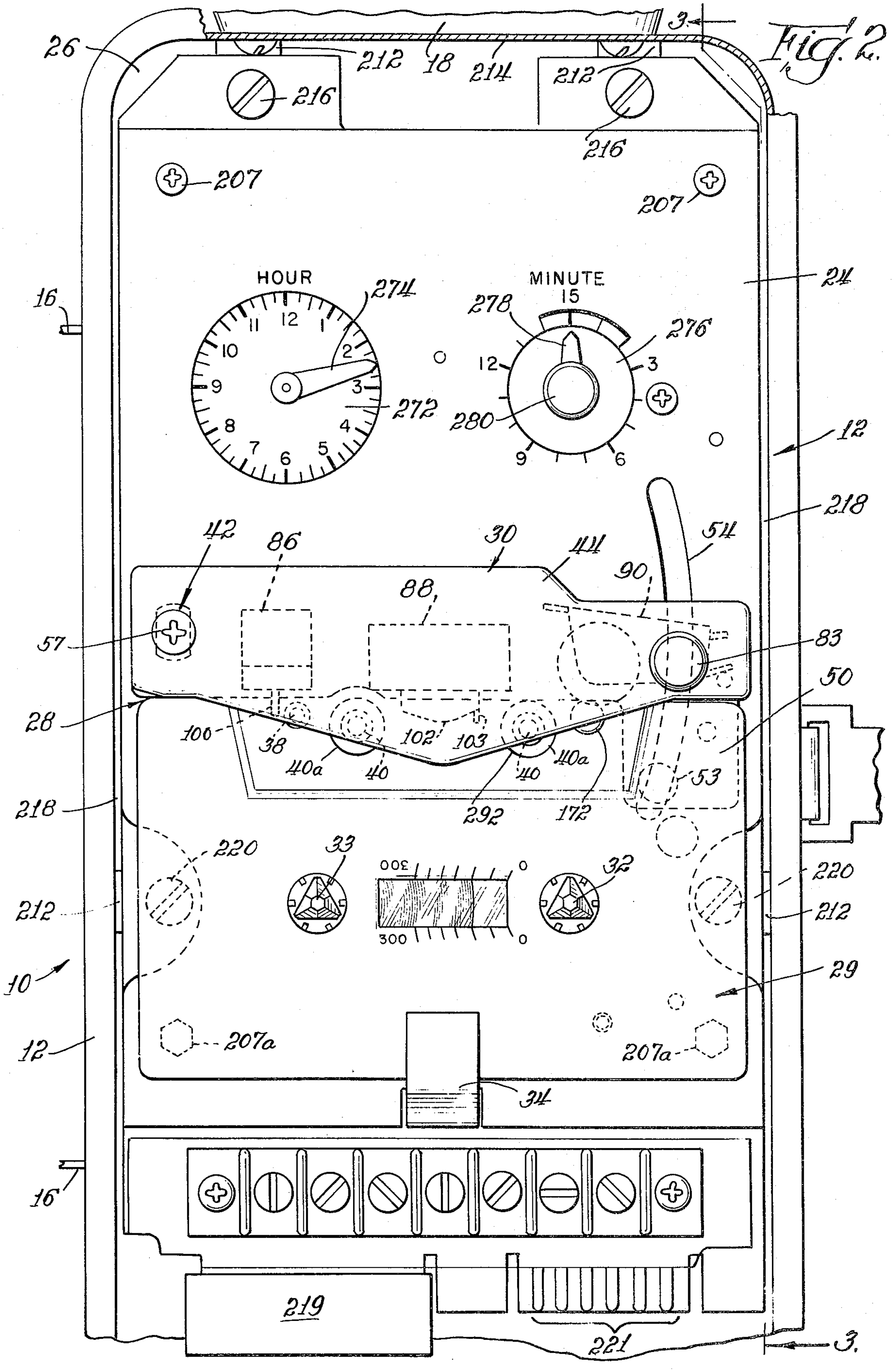
FIG. 2 is an enlarged view of the portion of FIG. 1 illustrating the components mounted inside the survey recorder casing with the pivotally mounted arm member shown in its operating relation with a magnetic tape cartridge.

A front plate 24 having a generally rectangular shape is disposed across the open end of the casing 12 in a parallel relationship to the rear wall 26 of the casing. A tape cartridge receptacle 28 is located on this front plate 24 to receive a magnetic tape cartridge 29 (FIG. 2). The tape cartridge receptacle 28 includes a pivotally mounted arm member 30, a pair of reel knobs 32, 33, a cassette latch 34, a capstan 36, a keying pin 38 and a pair of guide pins 40.

The arm member 30 is pivotally mounted on the front plate 24 by means of pivot pin member 42 which extends through one end of the cover member and is located on plate 24. Arm member 30 has an elongated rectangular housing 44 with a bottom opening 46. The inner sidewall 48 (FIG. 6) of the housing 44, which is preferably made of a metal plate, extends generally parallel to the front plate 24 and has a downwardly extending nose portion 50. A pair of guide pins 52, 53, one being mounted in the nose portion 50, are mounted through the sidewall 48 and their outer edges ride in arcuate slot 54, which is formed through front plate 24.

Pivot pin 42 (FIG. 6) comprises a bolt 55 having an elongated hexagonal head portion 56 extending between the sidewalls of the cover member 44 (which cover member 44 is held in place by screw 57), and having a threaded portion 58 which extends through washer 59, bearing 60, washer 61, and is screwed into post 62. The post 62 extends perpendicular in a rearward direction from front plate 24 and forms a part of the spring bias means 64 which constantly urges the arm member 30 into the downward operative position. The spring biasing means 64 (FIG. 4) also includes a second post 66 mounted perpendicular to the post 62 and a spring 68 stretched between the outer end of post 66 and a post 70 extending from the rear surface of the front plate 24.

Figure 4:
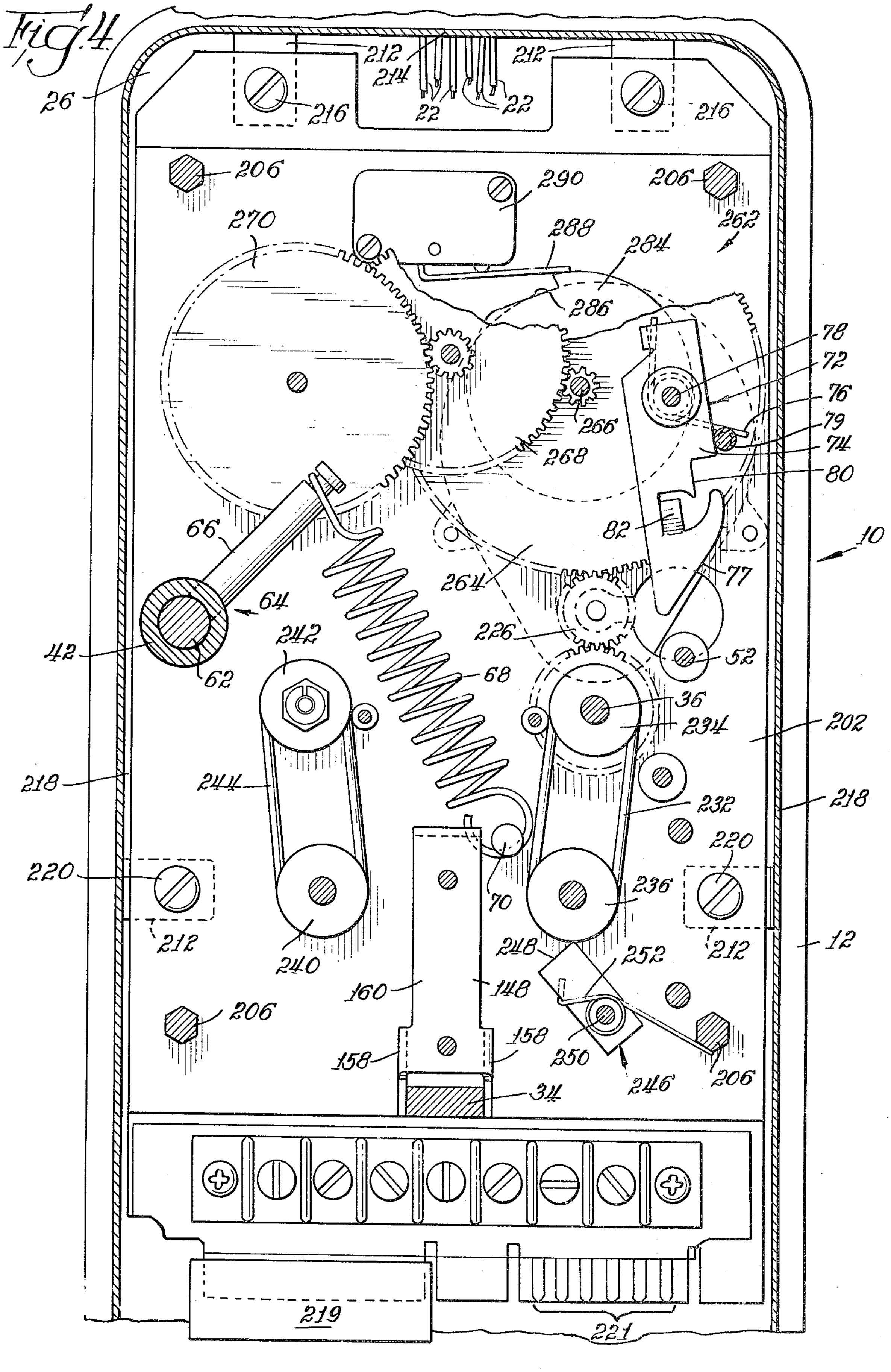
FIG. 4 is a sectional view taken along the line 4—4 of FIG. 3 and looking in the direction of the arrows.

To hold the arm member 30 in the upward inoperative position of FIG. 1, a latch means 72 (FIG. 4 is provided. Latch means 72 comprises a pivotally mounted latch member 74 and a torsion spring 76 which constantly urges the free end of the latch 74 towards the right as viewed in FIG. 4 about the pivot pin 78 where it abuts against stop lug 79. The free end of the latch member 74 has a camming surface 77 which is disposed in the path of the guide pin 52 such that as the arm member 30 is raised upwardly the associated guide pin 52 rides along the camming surface 77 causing the latch member 74 to pivot about pin 78 toward the left, as viewed in FIG. 4, until the guide pin 52 reaches the cam slot 80. Upon the guide pin 52 falling into the cam slot 80 the latching lever 74 swings to the right trapping the pin 52 into the bottom of the latching slot 80 to hold the end of the arm member 30 in the upper inoperative position. At the base of the camming slot 80 there is provided a laterally extending ramp 82 which cooperates with the guide pin 52 to free the guide pin from its latching engagement with the latching lever 74. Upon a slight upward movement of knob 83 on the outer end of arm member 30 guide ramp 82 causes the free end of the latching lever 74 to be lateraly shifted with respect to the guide pin 52 to thereby free the latch 74 to swing to the right as viewed in FIG. 4. The arm member 30 is then free to swing downwardly under the biasing force of spring 68 to the operative horizontal position of FIG. 2.

Figures 5, 6:
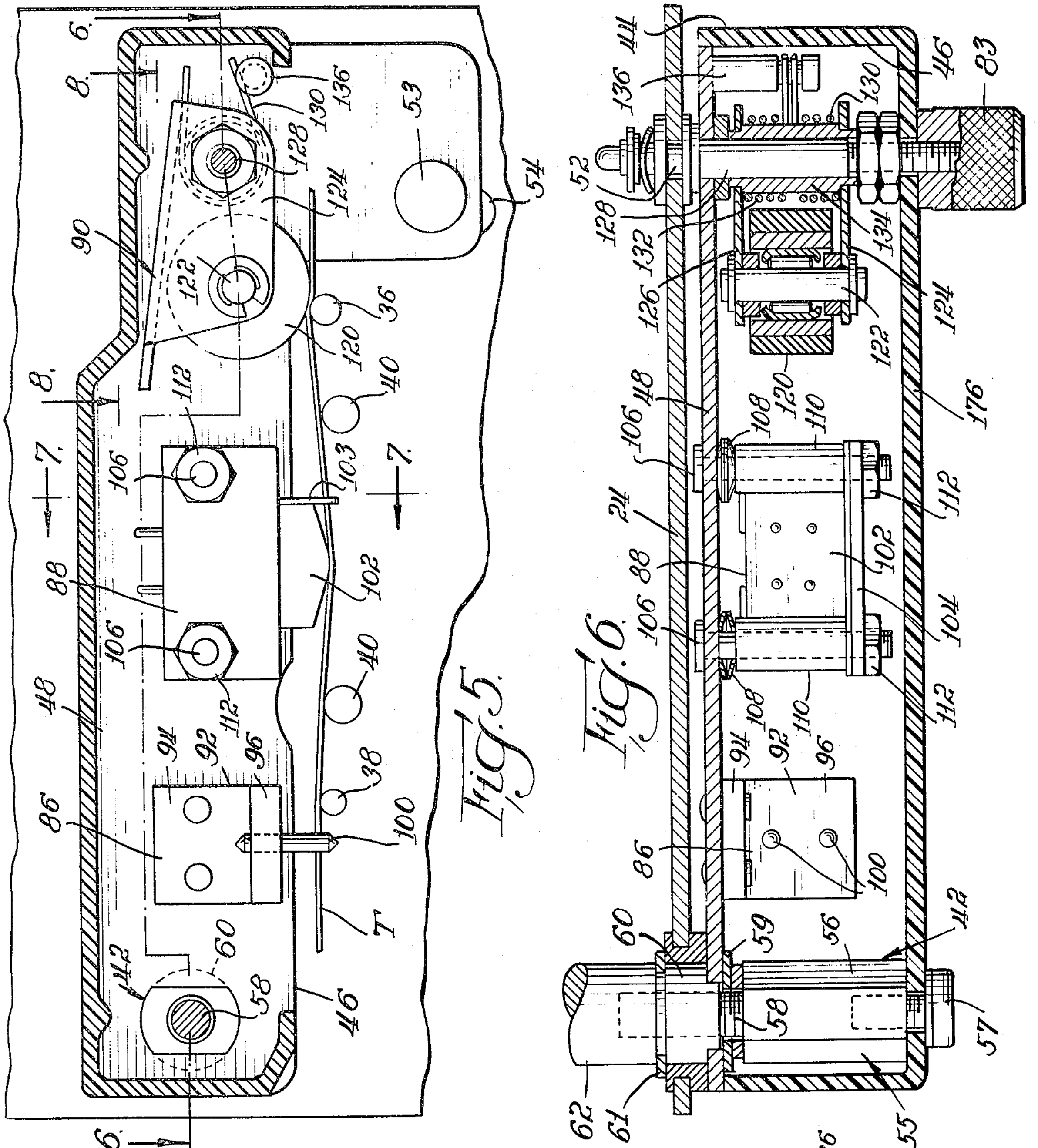
FIG. 5 is a sectional view of FIG. 3 taken along the line 5—5 showing the pivotally mounted recording head disposed in an operating relation with the magnetic tape cartridge.
FIG. 6 is a cross sectional view taken along the line 6—6 of FIG. 5 and looking in the direction of the arrows.
Figure 7:
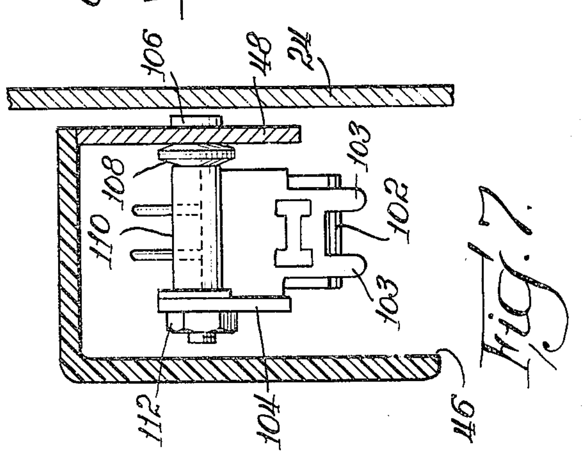
FIG. 7 is a cross sectional view taken along the line 7—7 of FIG. 5, and looking in the direction of the arrows.

As best illustrated in FIGS. 5 and 6, there is mounted lengthwise in the housing 44 of the arm member 30 a tape guiding member 86, a tape recording head unit 88, and a pressure roller unit 90. The tape guiding member 86 has an L-shaped frame 92 in which the vertical leg 94 is fastened on the inner sidewall 48 and the horizontal wall 96 supports a pair of downwardly extending guide legs 100 through which the tape in the tape cassette passes.

The recording head unit 88 employs a conventional multiple track recording head 102 which is secured to a mounting plate 104 and includes a pair of spaced guide pins 103. The mounting plate 104 is connected in a parallel relation to inner wall 48 by means of a pair of bolts 106 which extend through openings in the inner wall 48 through a pair of bellville washers 108, cylindrical sleeve 110 and through aligned openings at the opposite end of the plate 104. The use of the bellville washers 108 serve the important function of permitting the recording head 102 to be aligned relative to the tape cartridge receptacle 28 and guide pins 40. By tightening or loosening the nuts 112 on the ends of bolts 106 the azimuth orientation of the recording head 112 can be changed as desired. It is thus possible to vary the angular orientation of the recording head 102 relative to the pair of space guide pins 40.

Figure 8:
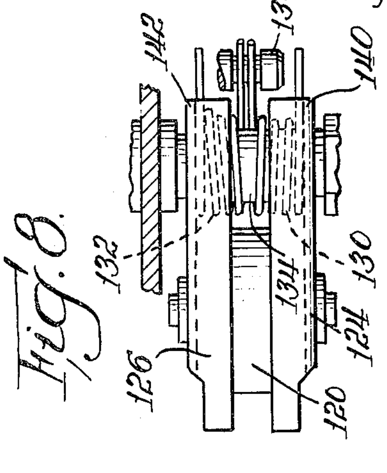
FIG. 8 is a cross sectional view of FIG. 5 taken along the line 8—8 and looking in the direction of the arrows.

The pressure roller unit 90 has a relatively large roller 120 which bears against the capstan 36 when the arm member is in the operative position of FIG. 5. The roller 120 is rotatably supported by a pin 122 which extends between the outer free end of a pair of arm members 124, 126. These arm members are rotatably supported in spaced relation on a pivot pin 128 by means of a cylindrical sleeve 134. To perfectly align the roller 120 relative to the capstan 36 across the entire width of the roller, the arm supports 124 and 126 are independently spring biased towards the capstan 36 by means of the pair of springs 130 and 132 disposed about the cylindrical sleeve 134. As depicted in FIGS. 6 and 8, one end of spring 130 presses against stud 136 extending generally parallel to the pivot pin 128 and the other end of the spring 130 presses upwardly on the rear corner of the top flange 140 for arm support 124 to urge the outer free end of the arm support 124 towards capstan 36. Similarly, spring 132 has one end abutting against stud 136 and its other end pressing against the rear edge of top flange 142 to urge the free end of arm support 126 towards the capstan 36. By virtue of using two separate arm members that are biased independently by two separate springs, the amount of force exerted by roller 120 against the capstan 36 is the same at all locations across the width of roller 120, thereby providing a self-alignment of the pressure roller 120 relative to the capstan 36.

The cassette latch 34 is mounted on the lowermost end of the front plate 24 at its approximate mid-section line and is designed to aid in inserting the tape cartridge 29 into the cartridge receptacle 28 and to hold it in place. The cassette latch 34 comprises a pivotally mounted catch member 146 (FIG. 3) which is pivotally mounted on an L-shaped bracket 148 and is urged to move to either the latching or unlatching positions illustrated in FIG. 3 by the solid and dotted lines, respectively. The catch member 146 is formed with a rear end portion 152 and a forward extending portion 154 having a pair of upstanding spaced fingers 156 and 157. The catch member 146 if pivotally mounted between a pair of flanges 158 formed at the lower end of the vertical leg 160 for the bracket 148 by means of a pivot pin 162, which extends through openings in the flanges 148 and through a passageway formed in the catch member 34 adjacent the base of the rearward extending portion 152.

Figure 3:
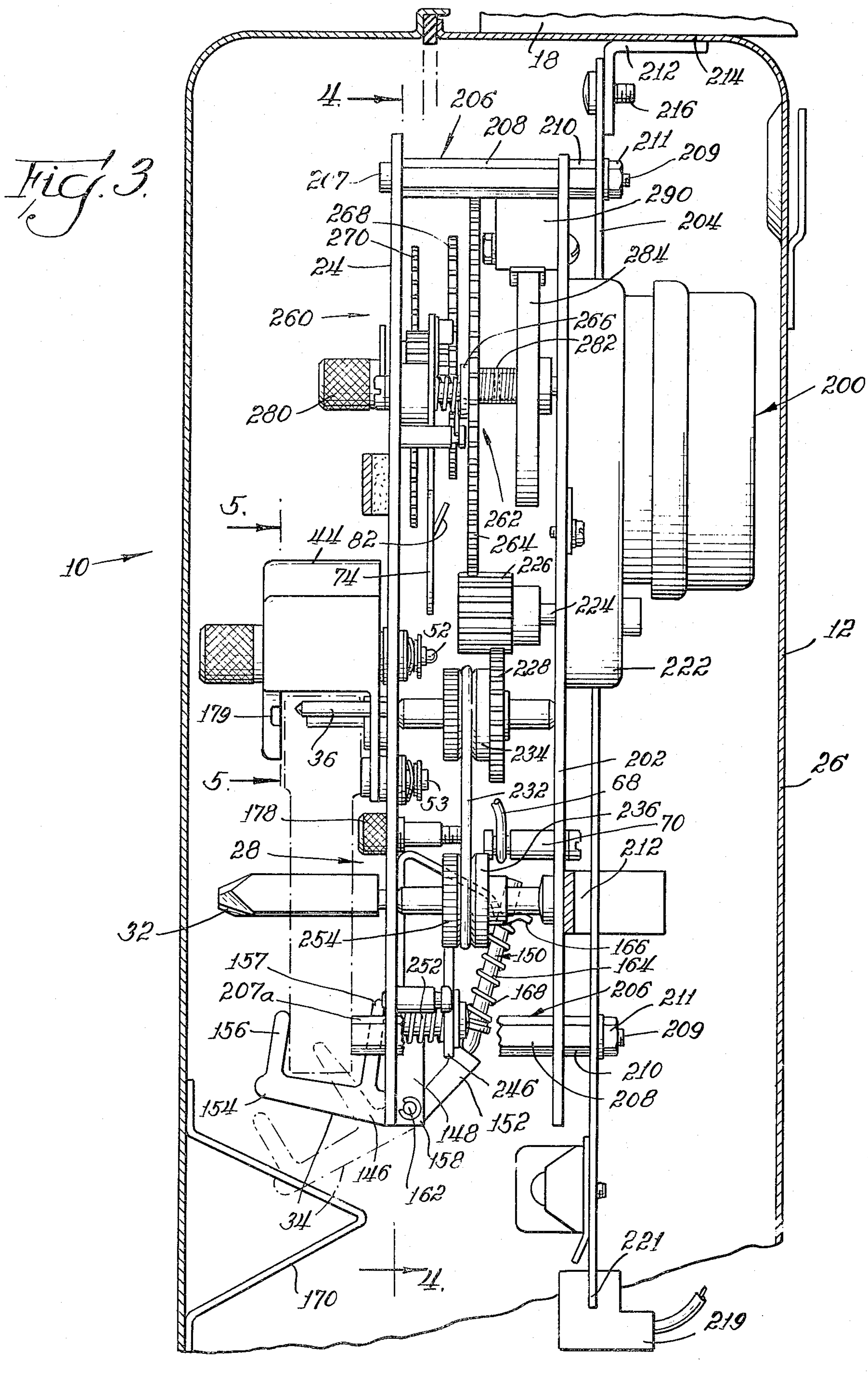
FIG. 3 is a sectional view taken along the line 3—3 of FIG. 2 and looking in the direction of the arrows.

The spring member 150 comprises a plunger 164 having its upper end disposed through an aperture (not shown) in the outer end of the transverse leg 166 (FIG. 3) of bracket 160 and a pointed lower end which is held in a small circular aperture (not shown) formed in the outermost end of rear end portion 152 by means of a spring 168 disposed about the plunger 164 as shown in FIG. 3. This spring biased plunger urges the catch member 146 to move to either of the extreme positions represented by the solid and dotted lines in FIG. 3. In the solid line position of FIG. 3 the inner finger 157 determines the rest position of the catch member 146 and in the dotted line unlatched position, the rearward extending portion 152 abuts against the vertical leg 160 for the bracket 148 to determine the resting position of catch member 146.

To insert a tape cartridge 29, such as for example, a conventional Phillips type cassette into the receptacle 28 it is necessary to place the cartridge over reel knob 32 and guide pins 40 which automatically position the cartridge between the upstanding fingers 156, 157 with the catch member 34 in the dotted line position of FIG. 3. As pressure is applied to urge the cartridge in the direction of the front plate 24 the catch member 34 is swung to the solid line position, and the cartridge is swung inwardly into the receptacle 28 to bring the cartridge into operative engagement with the pair of reel knobs 32, 33 and capstan 36. At this time, the cartridge has been urged into its operating position by the catch member 34 wherein the underside of the cartridge rests on the upper flat surface of a pair of threaded fastener members 207*a* and also on the shoulder portion 40a of guide pins 40. Thus four reference surfaces are provided to insure alignment of the cartridge tape with the recording head during operation.

As a preventive technique the cover member 14 for the casing 12 is provided with a triangular-shaped bumper 170 which engages the catch member 146 as the cover member is moved to the closed position and cams it from the dotted line position to the solid line latching position as depicted in FIG. 3 if the cartridge has been properly inserted by the user. The cover also locates a stop member 171 which prevents closing of the cover 14 in the event that the user has inserted the cartridge but has failed to move arm 30 into the operating position. That is, if the cover is moved toward the closed position, the stop member 171 will engage knob 83 which in turn prevents closing of the cover to alert the user to the fact that the recording mechanism has not been engaged.

To insure that the tape cartridge 29 is correctly inserted into the receptacle 28 a plug 172 is inserted at one side of one of the pin receiving apertures. The outer sidewall 176 of the arm member 30 has a cut-out 178 to accommodate this plug 172 (FIG. 2). Consequently, if the tape cartridge is turned over to its other side, the cartridge cannot be moved to its operating position because plug 172 prevents penetration of keying pin 38 into the cartridge.

To prevent damage to the arm member 30 and its components, a shipping pin 179 (FIG. 3) is conveniently stored on the front plate 24, which may be unscrewed from its threaded storing aperture of FIG. 3 and then screwed into the shipping threaded aperture 182 (FIG. 1) which is in the path of travel of arm member 30.

The power means for driving the components of the tape survey recorder 10 through motion transmitting means is provided by an electric a-c motor 200 which is mounted on the rear surface of a support plate 202 that extends behind and parallel to the front plate 24. Both the front plate 24 and support plate 202 are supported in spaced parallel relation with a printed circuit board 204 which contains the electronic circuitry for the survey recorder 10.

The front plate 24, support plate 202 and printed circuit board 204 are maintained in their parallel spaced relation by means of four mounting posts 206 which are made up of four long hexagonal spacers 208 separating the front plate 24 from the supporting plate 202 and four short hexagonal spacers 210 separating the supporting plate 202 from the printed circuit board 204. At the upper end of the front plate 24 as viewed in FIG. 3 screws 207 are inserted through each of two apertures in front plate 24 and screwed into corresponding threaded apertures at the outer end of spacers 208. At the lower corner of front plate 24 threaded fasteners 107*a* are inserted through the apertures in front plate 24 and screwed into corresponding threaded apertures at the outer ends of spacers 208. The short hexagonal spacer 210 in each case has a threaded end portion 209 which is inserted through an opening in each of the four corners of supporting plate 202 and a nut 211 is secured thereon.

The printed circuit board 204 is attached to a pair of L-shaped brackets 212 mounted on the top wall 214 of the casing 12 by means of screws 216 threaded through the bracket 212. A similar pair of L-shaped brackets 212 are attached to the sidewalls 218 of the casing 12 on which the supporting plate 202 is attached by means of screws 220. There is shown in FIG. 2, an edge connector 219 plugged into engagement with one of the two sets of blade connectors 221 for the printed circuit board 204.

The electric motor unit 200 includes a gear box 222 which reduces the output speed of the electric motor to 1/3 revolution per minute at the output shaft 224. A spur gear or common drive means 226 is fastened to the outer end of output shaft 224 and through its intermeshing relation with spur gear 228 forming a portion of the motion transmitting means drives capstan 36 also a portion of the motion transmitting means. A slip spring belt 232 is trained around pulley 234 on the capstan 36 and pulley 236 on the take-up reel knob 32 to provide a take-up drive for the tape cartridge 29 for winding the tape on the take-up reel as it leaves the capstan. The supply reel knob 33 is provided at its inner end with a pulley 240 which is interconnected to a non-turning pulley 242 by means of a second slip spring belt 244 to provide proper tape tension against the recording head.

The length of the takeup reel knob 32 is made to project beyond the outer face of the tape cartridge to permit it to be grasped by a person for the purpose of advancing the tape a desired amount. The supply knob 33 however does not project significantly beyond the outer face of the cartridge to deter movement thereof by the user.

To insure that the takeup reel knob 32 is turned only in the direction to advance the magnetic tape in the cartridge, a one-way clutch device 246 is provided. Referring to FIG. 4, the one-way clutch device comprises a pawl member 248 pivotally mounted on pin 250 and biased towards the pulley 236 by spring 252 to grip its gear teeth 254. Thus, the one-way clutch device 246 acts as a ratchet pawl which permits the pulley 236 to turn only in a clockwise direction.

The drive motor 200 also provides the power for timing device 260 which provides timing pulses to the recording head 102 for the timing track of the magnetic tape. The gear train 262 also forming a portion of the motion transmitting means for the timing unit 260 comprises a first driven gear 264 which is driven by common drive means 226 and is mounted on the minute shaft 266 and drives an intermediate gear 268 which in turn drives the hour gear 270. On the front face of plate 24 there is a time dial 272 which is calibrated in hours. Hour hand 274 or display member turns about time dial 272 as the hour gear 270 is driven. Similarly, a 15-minute time dial scale 276 is provided on the front plate 24 to the right of the hour time setting and a minute hand 278 or display member rotates thereabout as the minute gear is driven. A reset knob 280 mounted on the end of shaft 266 can be manually rotated clockwise to advance the timing device 260 to the correct time of day. A one-way clutch spring 282 allows the reset knob to be turned only in the clockwise direction.

At the inner end of the minute shaft 266, there is provided a cam 284 having a slot 286 in its outer peripheral surface. As shown in FIG. 4, the switch contact arm 288 of a pulse generating means or snap-action switch 290 acts as a cam follower which rides against the cam surface of cam 284. As a consequence, the switch arm 288 drops into the cam slot 286 once each revolution to thereby actuate the switch which sends an electrical signal to the recording head 102.

In operation of the survey recorder 10, the cartridge 29 is inserted into the cartridge receiving receptacle 28 by positioning the opening in the cartridge 29 over the cartridge guide pins 40 and reel knob 32, and then pressing inwardly on the cartridge to engage the cartridge latch 34. The capstan 36, the keying pin 38 and reel knob 33 are automatically engaged. Either prior to insertion of the cassette of at this point, the time is set by turning the adjustment knob 280 clockwise to advance the timer to the correct time of day.

With the time set and the cartridge fully inserted into the receptacle 28, the arm member 30 is swung downwardly about the pivot point of pin 42 until the lowermost horizontal edge of back plate 48 abuts against the surface 292 of the base 40*a* right most alignment pin 40 as depicted in FIG. 2. Prior to the arm member reaching this stopped position the pressure roller 120 comes into engagement with the capstan 36 to insure that the pressure roller is in full engagement with the capstan during the recording operation.

The contact closures generated by the watthour meter contact devices (not shown) and the timing switch device 290 result in the application of electrical signals representative of data and time to the recording head 102 for recording on the tape's time and data tracks. The recorder 10 uses the non-return-to-zero recording principle, i.e., a continuous direct current flows through the recording head at all times. When the watthour meter contact device changes from one position to the other, the current through the recording head is reversed. Similarly, in the timing channel the opening and closing of the timing switch 290 causes current reversal to provide a continuous recording on the magnetic tape with a reversal in the magnetic polarity at the change of state of each switch.

We claim:

1. A load survey recorder comprising a fixedly immovable front plate, a fixed tape cartridge receptacle located on the outer surface of said front plate for receiving a tape cartridge having at least a first and a second guide hole, said receptacle including a capstan, a pair of reel knobs, and at least first and second fixedly positioned aligning pins for engaging said guide holes in said cartridge to position the same along the X and Y axes relative to the recorder head, all of which are supported by and extend perpendicular to said front plate, an elongated arm member extending in close parallel relation to said outer surface and pivotally mounted at one end on said fixedly immovable front plate for movement between an inoperative position and an operative position, spring means for biasing said arm member in the direction of the operative position, a tape recording head unit mounted on said arm member having a recording head extending downwardly from said arm member, and a pressure roller unit mounted on said arm member at its outer end, said pressure roller unit including a roller, and means for resiliently urging said roller downwardly, where said roller is in resilient engagement with said capstan upon said arm member being located at said lower operative position.

2. A load survey recorder as defined in claim 1 wherein said arm member includes stop means for engaging a surface on one of said aligning pins to define said lower operative position after said roller comes into full contact with said capstan.

3. A load survey recorder as defined in claim 1 which further includes releasable latch means comprising a latch member having a latching slot and a guide pin on said arm which pivots said latch to cause said latching slot to engage said guide pin, and to thereby hold said arm in the upper inoperative position.

4. A load survey recorder as defined in claim 3 further comprising a removable shipping pin means attached to said front plate along the path of said arm member to maintain said arm in a position intermediate said inoperative and operative positions, and in a position to prevent insertion of the cartridge into said cartridge receptacle.

5. A load survey recorder as set forth in claim 1 in which only one of said reel knobs has an end portion which projects significantly above the cartridge to enable the user to advance the tape on the cartridge while located in the tape cartridge receptacle.

6. A load survey recorder as set forth in claim 5 in which one of said reel knobs is attached to a takeup reel, and which includes ratchet and pawl means for permitting rotation of the takeup reel in only one direction.

7. A load survey recorder as set forth in claim 1 in which each of said alignment pins has a shoulder portion for use in positioning the tape cartridge in the Z axis.

8. A load survey recorder comprising a front plate, a tape cartridge receptacle for receiving a conventional tape cartridge located on the outer surface of said front plate, said receptacle including a capstan, and a pair of reel knobs, all of which extend perpendicular to said front plate, a support member mounted for movement in close parallel relation to said outer surface between an inoperative position and an operative position, a tape recording head, and a pressure roller unit mounted on said support member for engagement with said capstan whenever said support member is located in its operative position, common rotational drive means which operate at a predetermined rotational speed, pulse generating means for generating pulses at predetermined intervals which represent time motion transmitting means driven by said common rotational drive means to operate said capstan in the advancement of said tape at a rate proportional to the rotational speed of said common drive means, and to operate said pulse generating means to generate pulses at a rate proportional to the rotational speed of said common drive means, and means for coupling said pulses generated by said pulse generating means to said recording head unit to record the pulses representative of time on said tape as advanced by said pressure roller and said capstan, whereby the generation of time representative pulses and the tape movement are mechanically synchronized.

9. A load survey recorder as defined in claim 8, further comprising a casing for enclosing said recorder, said casing having an open end, and a cover for closing said open end of said casing, hinge means for attaching said cover to one side of said casing, a catch member for locking said cartridge in the operative position, and bumper means extending from the inside surface of said cover for camming said catch member to said latched position upon said cover being swung to the closed position.

10. A load survey recorder as set forth in claim 8 wherein said recording head unit includes a first track for recording said pulses representative of time on said tape, and a second track for recording signals representative of data on said tape.

11. A load survey recorder as set forth in claim 8 wherein said motion transmitting means includes a gear train for operating said pulse generating means and said pulse generating means comprises a switch having an operating member which is operated with each predetermined movement of said gear train.

12. A load survey recorder as set forth in claim 8 which further includes a display member operable by said motion transmitting means to indicate minutes of time.

13. A load survey recorder comprising a casing having an open end, a tape cartridge receptacle including a capstan, and a pair of reel knobs, motion transmitting means for driving said capstan and at least one of said reel knobs, an arm member supported for movement between an inoperative position and an operative position, a tape recording head unit mounted on said arm member for movement into a tape recording position with movement of said arm member to said operative position, and a pressure roller unit mounted on said arm member for resilient engagement with said capstan whenever said arm member is located at said operative position, and a cover for closing said open end of said casing including a stop member located to engage said arm member and prevent closure of the cover whenever said arm member is in said inoperative position.

14. A load survey recorder comprising a tape cartridge receptacle including a capstan, and a pair of reel knobs, motion transmitting means for driving said capstan and at least one of said reel knobs an arm member supported for movement between an inoperative position and an operative position, a tape recording head unit mounted on said arm member for movement into a tape recording position with movement of said arm member to said operative position and a pressure roller unit mounted on said arm member including a roller, and means for resiliently urging said roller downwardly comprising a pivot pin extending perpendicularly from a wall member of said arm member, a pair of arm support members each having one end pivotally mounted on said pivot pin in a spaced relation, a shaft pin secured between said arm support members and rotatably supporting said pressure roller, first and second spring members biasing first and second arm support members, respectively, to independently urge said support members downwardly and thereby exert a uniform force across the width of said pressure roller upon engagement with said capstan.

15. A load survey recorder comprising a fixedly immovable plate, a tape cartridge receptacle located on the outer surface of said front plate, said receptacle including a capstan, a pair of reel knobs, and a plurality of aligning pins, all of which are supported by and extend perpendicular to said front plate, an elongated arm member extending in close parallel relation to said outer surface and pivotally mounted at one end on said fixed front plate for movement between an inoperative position and an operative position, a tape recording head unit mounted on said arm member and having a recording head extending downwardly from said arm member, and a pressure roller unit mounted on said arm member at its outer end, a tape guiding member mounted on said arm member between said one end and said tape recording head unit and having a pair of downwardly extending guide legs spaced apart a distance slightly larger than the width of the magnetic tape to be used in the load survey recorder, and a second guide member located along the path of said tape spaced from said first guiding member and having a pair of downwardly extending guide legs, the two sets of guide legs thereby providing guidance of the tape relative to the recording head said tape recording head unit further comprising a mounting plate supporting said recording head, a pair of leg members extending from the ends of said mounting plate in a generally perpendicular relation, and resilient mounting means for fastening the outer ends of said leg members to said wall member for changing the angular orientation of said recording head.

16. A load survey recorder comprising a casing having an open end, a tape cartridge receptacle including a capstan, and a pair of reel knobs, motion transmitting means for driving said capstan and at least one of said reel knobs, an arm member supported for movement between an inoperative position and an operative position, a tape recording head unit mounted on said arm member for movement into a tape recording position with movement of said arm member to said operative position, a pressure roller unit mounted on said arm member for resilient engagement with said capstan whenever said arm member is located at said operative position, a releasable latch means for releasably holding said arm member in said inoperative position, comprising a lever pivotally mounted on the inner surface of a front plate disposed in said recorder and having its free end biased in one direction, a latching slot on said lever being effective to hold a guide pin on said arm member to maintain the same in its upper inoperative position, a laterally extending ramp means connected to said lever and located adjacent said latching slot, and camming surface means formed adjacent the free end of said lever, whereby whenever said arm member is moved upwardly said guide pin will contact said camming surface and pivot said latch lever until said latching slot contacts said guide pin to hold said arm member in its inoperative position, said ramp means being effective upon slight upward movement of said arm member to enable the free end of said lever to be laterally shifted to a position which permits said arm member to move to the operative position.

17. A load survey recorder as set forth in claim 16 which includes said tape cartridge receptacle, said capstan, a cover hingedly connected to said casing for closing said open end and having a stop member thereon which is effective to prevent closing of said cover whenever said arm member is in the upper inoperative position by virtue of contact between said stop member and said arm member.

18. A load survey recorder comprising a casing having an open end, a tape cartridge receptacle incuding a pair of reel knobs, motion transmitting means for driving at least one of said reel knobs, an arm member supported for movement between an inoperative position and an operative position, a tape recording head unit mounted on said arm member for movement of said arm member to said operative position, a pressure roller unit mounted on said arm member for resilient engagement with said capstan whenever said arm member is located at said operative position, pulse generating means for generating pulses representative of time for recording on said tape, motion transmitting means for operating said capstan and said pulse generating means including a rotatable drive shaft, a cam member coupled to said rotatable drive shaft for operating said pulse generating means with each predetermined rotational movement of said drive shaft, and means for coupling said pulses to said head unit for recording on the tape as driven by said capstan, and a first adjustable display member coupled to said rotatable drive shaft for providing a display of time.

19. A load survey recorder as set forth in claim 18 in which said first display member provides an indication of minutes of operation and which further includes a second adjustable display member for displaying hours of time of operation, and means coupled to said rotatable drive shaft for driving said second display member.

20. A load survey recorder comprising a casing having an open end, a fixedly immovable front plate disposed across said open end, a tape cartridge receptacle formed on the outer surfaces of said front plate, said receptacle including a capstan, a pair of reel knobs, and a plurality of aligning pins for said cartridge, all of which are supported by and extend perpendicular to said front plate, an elongated arm member having a wall member extending in close parallel relation to said outer surface and pivotally mounted at one end for movement between an upper inoperative position and a lower operative position, a tape recording head unit mounted on said wall member and including a recording head extending downwardly from said arm member and adjustable means for varying the angular orientation of said recording head relative to the path of travel of the tape in a cartridge located in said receptacle, and a pressure roller unit mounted on said wall member at its outer free end, said pressure roller unit including a roller and means for resiliently urging said roller in a downward direction, where said roller is in resilient engagement with said capstan upon said arm member being located at said lower operative position, said means for resiliently urging the opposite ends of said roller independently comprising a pivot pin extending perpendicularly from said outer free end of said wall member, a pair of arm support members each having one end pivotally mounted on said pivot pin in a spaced relation, a pin secured between the other end of said arm support member and rotatably supporting said shaft pin, first and second spring members biasing first and second arm support members, respectively, to independently urge said other end of said two arm support members downwardly and thereby exert a uniform force across the width of said pressure roller upon engagement with said capstan.

21. A load survey recorder as defined in claim 20, wherein said wall member includes stop means for engaging a fixed member to define said lower operative position after said roller comes into full contact with said capstan.

22. A load survey recorder as defined in claim 21 in which said fixed member comprises a shoulder portion on one of said aligning pins.

23. A load survey recorder as defined in claim 20 wherein said adjustable means for varying the angular orientation of said recording head comprises a mounting plate supporting said recording head, a pair of leg members extending from the ends of said mounting plate in a generally perpendicular relation and resilient mounting means for fastening the other ends of said leg members to said wall member for changing the angular orientation of said recording head.

24. A load survey recorder as set forth in claim 20, wherein said fixed front plate is formed with a generally arcuate slot, and said arm member includes a guide pin located at one end thereof and received within said front plate slot.

25. A load survey recorder as set forth in claim 24 which further includes a releasable latch means having a lever pivotally mounted on the inner surface of said front plate and its free end biased in one direction, a latching slot on said lever being effective to hold said guide pin in the inoperative position, a laterally extending ramp means connected to said lever and located adjacent said latching slot, and a camming surface formed adjacent the free end of said lever, whereby whenever said arm member is moved from the operative to the inoperative position said guide pin will contact said camming surface and pivot said latch member until said latching slot contacts said guide pin to hold said arm member in its upper inoperative position, said ramp means being effective upon slight upward movement of said arm member to enable the free end of said lever to be laterally shifted to a position which permits said arm member to move to the operative position.

26. A load survey recorder as defined in claim 24, further comprising a cover for closing said open end of said casing, hinge means for attaching said cover to one side of said casing, a catch member for locking a cartridge in said receptacle in the operative position and bumper means extending from the inside surface of said cover for camming said catch member to said latched position upon said cover being swung to the closed position.

* * * * *